(12) United States Patent
McCune et al.

(10) Patent No.: US 12,385,409 B2
(45) Date of Patent: *Aug. 12, 2025

(54) EPICYCLIC GEAR TRAIN

(71) Applicant: RTX CORPORATION, Farmington, CT (US)

(72) Inventors: Michael E. McCune, Colchester, CT (US); Lawrence E. Portlock, Bethany, CT (US); Frederick M. Schwarz, Glastonbury, CT (US)

(73) Assignee: RTX CORPORATION, Farmington, CT (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/818,804

(22) Filed: Aug. 29, 2024

(65) Prior Publication Data
US 2025/0052168 A1 Feb. 13, 2025

Related U.S. Application Data

(63) Continuation of application No. 18/196,048, filed on May 11, 2023, now Pat. No. 12,084,978, which is a
(Continued)

(51) Int. Cl.
*F16H 57/04* (2010.01)
*F01D 1/02* (2006.01)
(Continued)

(52) U.S. Cl.
CPC ............ *F01D 15/12* (2013.01); *F01D 1/02* (2013.01); *F01D 5/02* (2013.01); *F01D 5/027* (2013.01);
(Continued)

(58) Field of Classification Search
CPC ... F01D 1/02; F01D 5/02; F01D 25/18; F02K 3/06; F05D 2220/32; F05D 2260/40311; F16H 57/04
See application file for complete search history.

(56) References Cited

U.S. PATENT DOCUMENTS

| 936,655 A | 10/1909 | McLaughlin |
| 1,130,872 A | 3/1915 | Winckler |

(Continued)

FOREIGN PATENT DOCUMENTS

| CN | 1952435 A | 4/2007 |
| EP | 0791383 A1 | 8/1997 |

(Continued)

OTHER PUBLICATIONS

Guynn, M. D., Berton, J.J., Fisher, K. L., Haller, W.J., Tong, M. T., and Thurman, D.R. (2011). Refined exploration of turbofan design options for an advanced single-aisle transport. NASA/TM-2011-216883. pp. 1-27.

(Continued)

*Primary Examiner* — Derek D Knight
(74) *Attorney, Agent, or Firm* — Carlson, Gaskey & Olds, P.C.

(57) ABSTRACT

A gas turbine engine according to an example of the present disclosure includes a propulsor section including a propulsor supported on a propulsor shaft, a turbine section including a turbine shaft, a compressor section having a plurality of compressor hubs with blades driven by the turbine shaft about an engine axis, and an epicyclic gear train interconnecting the propulsor shaft and the turbine shaft. The epicyclic gear train includes a sun gear coupled to the turbine shaft, intermediary gears arranged circumferentially about and meshing with the sun gear, a carrier and a ring gear including first and second portions. The first and second portions have axially opposed faces abutting one another at a radial interface.

20 Claims, 3 Drawing Sheets

Related U.S. Application Data continuation of application No. 17/711,177, filed on Apr. 1, 2022, now Pat. No. 11,680,492, which is a continuation of application No. 17/145,766, filed on Jan. 11, 2021, now Pat. No. 11,319,831, which is a continuation of application No. 16/805,917, filed on Mar. 2, 2020, now Pat. No. 10,890,245, which is a continuation of application No. 15/984,494, filed on May 21, 2018, now Pat. No. 10,577,965, which is a continuation of application No. 14/824,351, filed on Aug. 12, 2015, now Pat. No. 9,976,437, which is a continuation-in-part of application No. 13/486,766, filed on Jun. 1, 2012, now abandoned, which is a continuation of application No. 13/340,735, filed on Dec. 30, 2011, now Pat. No. 8,708,863, which is a continuation-in-part of application No. 11/504,220, filed on Aug. 15, 2006, now Pat. No. 8,753,243.

(51) Int. Cl.
  *F01D 5/02* (2006.01)
  *F01D 15/12* (2006.01)
  *F01D 25/16* (2006.01)
  *F01D 25/18* (2006.01)
  *F02C 7/32* (2006.01)
  *F02C 7/36* (2006.01)
  *F02K 3/06* (2006.01)
  *F16H 57/08* (2006.01)

(52) U.S. Cl.
  CPC ............. *F01D 25/16* (2013.01); *F01D 25/18* (2013.01); *F02C 7/32* (2013.01); *F16H 57/04* (2013.01); *F02C 7/36* (2013.01); *F02K 3/06* (2013.01); *F05D 2220/32* (2013.01); *F05D 2220/36* (2013.01); *F05D 2240/70* (2013.01); *F05D 2260/34* (2013.01); *F05D 2260/40311* (2013.01); *F16H 57/0423* (2013.01); *F16H 57/0479* (2013.01); *F16H 57/0486* (2013.01); *F16H 2057/085* (2013.01)

(56) References Cited

U.S. PATENT DOCUMENTS

| | | |
|---|---|---|
| 1,220,171 A | 3/1917 | Berghorn |
| 1,478,551 A | 12/1923 | Castle |
| 1,649,114 A | 11/1927 | Otto et al. |
| 1,696,156 A | 12/1928 | Fenton |
| 2,258,792 A | 10/1941 | New |
| 2,288,792 A | 7/1942 | W.G. |
| 2,684,591 A | 7/1954 | Lundquist |
| 2,936,655 A | 5/1960 | Peterson et al. |
| 3,021,731 A | 2/1962 | Stoeckicht |
| 3,160,026 A | 12/1964 | William et al. |
| 3,194,487 A | 7/1965 | Tyler et al. |
| 3,287,906 A | 11/1966 | McCormick |
| 3,352,178 A | 11/1967 | Lindgren et al. |
| 3,412,560 A | 11/1968 | Gaubatz |
| 3,664,612 A | 5/1972 | Skidmore et al. |
| 3,722,323 A | 3/1973 | Welch |
| 3,747,343 A | 7/1973 | Rosen |
| 3,754,484 A | 8/1973 | Roberts |
| 3,765,623 A | 10/1973 | Donelson et al. |
| 3,820,719 A | 6/1974 | Clark et al. |
| 3,843,277 A | 10/1974 | Ehrich |
| 3,883,303 A | 5/1975 | Roberts |
| 3,892,358 A | 7/1975 | Gisslen |
| 3,932,058 A | 1/1976 | Harner et al. |
| 3,935,558 A | 1/1976 | Miller et al. |
| 3,988,889 A | 11/1976 | Chamay et al. |
| 4,130,872 A | 12/1978 | Haloff |
| 4,220,171 A | 9/1980 | Ruehr et al. |
| 4,240,250 A | 12/1980 | Harris |
| 4,284,174 A | 8/1981 | Salvana et al. |
| 4,289,360 A | 9/1981 | Zirin |
| 4,478,551 A | 10/1984 | Honeycutt, Jr. et al. |
| 4,583,413 A | 4/1986 | Lack |
| 4,649,114 A | 3/1987 | Miltenburger et al. |
| 4,696,156 A | 9/1987 | Burr et al. |
| 4,722,357 A | 2/1988 | Wynosky |
| 4,896,499 A | 1/1990 | Rice |
| 4,979,362 A | 12/1990 | Vershure, Jr. |
| 5,058,617 A | 10/1991 | Stockman et al. |
| 5,081,832 A | 1/1992 | Mowill |
| 5,102,379 A | 4/1992 | Pagluica et al. |
| 5,141,400 A | 8/1992 | Murphy et al. |
| 5,211,541 A | 5/1993 | Fledderjohn et al. |
| 5,223,616 A | 6/1993 | Yamamoto et al. |
| 5,302,031 A | 4/1994 | Yuasa |
| 5,317,877 A | 6/1994 | Stuart |
| 5,318,070 A | 6/1994 | Surabian |
| 5,361,580 A | 11/1994 | Ciokajlo et al. |
| 5,391,125 A | 2/1995 | Turra et al. |
| 5,433,674 A | 7/1995 | Sheridan et al. |
| 5,447,411 A | 9/1995 | Curley et al. |
| 5,466,198 A | 11/1995 | McKibbin et al. |
| 5,472,383 A | 12/1995 | McKibbin |
| 5,524,847 A | 6/1996 | Brodell et al. |
| 5,634,767 A | 6/1997 | Dawson |
| 5,677,060 A | 10/1997 | Terentieva et al. |
| 5,778,659 A | 7/1998 | Duesler et al. |
| 5,814,541 A | 9/1998 | Shibata |
| 5,857,836 A | 1/1999 | Stickler et al. |
| 5,915,917 A | 6/1999 | Eveker et al. |
| 5,975,841 A | 11/1999 | Lindemuth et al. |
| 5,985,470 A | 11/1999 | Spitsberg et al. |
| 6,158,210 A | 12/2000 | Orlando |
| 6,223,616 B1 * | 5/2001 | Sheridan ............... F16H 1/2827 184/6.12 |
| 6,315,815 B1 | 11/2001 | Spadaccini et al. |
| 6,318,070 B1 | 11/2001 | Rey et al. |
| 6,387,456 B1 | 5/2002 | Eaton, Jr. et al. |
| 6,402,654 B1 | 6/2002 | Lanzon et al. |
| 6,517,341 B1 | 2/2003 | Brun et al. |
| 6,530,858 B1 | 3/2003 | Usoro et al. |
| 6,607,165 B1 | 8/2003 | Manteiga et al. |
| 6,669,597 B1 | 12/2003 | Usoro et al. |
| 6,709,492 B1 | 3/2004 | Spadaccini et al. |
| 6,732,502 B2 | 5/2004 | Seda et al. |
| 6,814,541 B2 | 11/2004 | Evans et al. |
| 6,883,303 B1 | 4/2005 | Seda |
| 7,021,042 B2 | 4/2006 | Law |
| 7,219,490 B2 | 5/2007 | Dev |
| 7,328,580 B2 | 2/2008 | Lee et al. |
| 7,374,403 B2 | 5/2008 | Decker et al. |
| 7,591,754 B2 | 9/2009 | Duong et al. |
| 7,632,064 B2 | 12/2009 | Somanath et al. |
| 7,662,059 B2 | 2/2010 | McCune |
| 7,704,178 B2 | 4/2010 | Sheridan et al. |
| 7,806,651 B2 | 10/2010 | Kennepohl et al. |
| 7,824,305 B2 | 11/2010 | Duong et al. |
| 7,828,682 B2 | 11/2010 | Smook |
| 7,926,260 B2 | 4/2011 | Sheridan et al. |
| 7,950,151 B2 | 5/2011 | Duong et al. |
| 7,997,868 B1 | 8/2011 | Liang |
| 8,074,440 B2 | 12/2011 | Kohlenberg et al. |
| 8,205,432 B2 | 6/2012 | Sheridan |
| 8,894,538 B2 | 11/2014 | McCune et al. |
| 8,939,864 B2 | 1/2015 | McCune et al. |
| 9,752,511 B2 | 9/2017 | McCune et al. |
| 10,527,151 B1 | 1/2020 | McCune et al. |
| 10,570,855 B2 | 2/2020 | McCune et al. |
| 11,680,492 B2 * | 6/2023 | McCune ................ F01D 25/16 475/331 |
| 2002/0064232 A1 | 5/2002 | Fukuhara et al. |
| 2002/0064327 A1 | 5/2002 | Toda et al. |
| 2004/0112041 A1 | 6/2004 | Law |
| 2005/0026745 A1 | 2/2005 | Mitrovic |
| 2006/0228206 A1 | 10/2006 | Decker et al. |
| 2007/0225111 A1 | 9/2007 | Duong et al. |
| 2008/0003096 A1 | 1/2008 | Kohli et al. |

(56) References Cited

U.S. PATENT DOCUMENTS

| | | |
|---|---|---|
| 2008/0006018 A1 | 1/2008 | Sheridan et al. |
| 2008/0044276 A1 | 2/2008 | McCune et al. |
| 2008/0096714 A1 | 4/2008 | McCune |
| 2008/0116009 A1 | 5/2008 | Sheridan et al. |
| 2008/0116010 A1 | 5/2008 | Portlock et al. |
| 2008/0317588 A1 | 12/2008 | Grabowski et al. |
| 2009/0053058 A1 | 2/2009 | Kohlenberg et al. |
| 2009/0053606 A1 | 2/2009 | Kim et al. |
| 2009/0056306 A1 | 3/2009 | Suciu et al. |
| 2009/0056343 A1 | 3/2009 | Suciu et al. |
| 2009/0081039 A1 | 3/2009 | McCune et al. |
| 2009/0090096 A1 | 4/2009 | Sheridan |
| 2009/0111639 A1 | 4/2009 | Klingels |
| 2009/0293278 A1 | 12/2009 | Duong et al. |
| 2009/0298640 A1 | 12/2009 | Duong et al. |
| 2009/0304518 A1 | 12/2009 | Kodama et al. |
| 2009/0314881 A1 | 12/2009 | Suciu et al. |
| 2010/0105516 A1 | 4/2010 | Sheridan et al. |
| 2010/0148396 A1 | 6/2010 | Xie et al. |
| 2010/0150702 A1 | 6/2010 | Sheridan et al. |
| 2010/0212281 A1 | 8/2010 | Sheridan |
| 2010/0218483 A1 | 9/2010 | Smith |
| 2010/0317478 A1 | 12/2010 | McCune et al. |
| 2010/0331139 A1 | 12/2010 | McCune |
| 2011/0130246 A1 | 6/2011 | McCune et al. |
| 2011/0159797 A1 | 6/2011 | Beltman et al. |
| 2011/0293423 A1 | 12/2011 | Bunker et al. |
| 2012/0124964 A1 | 5/2012 | Hasel et al. |
| 2012/0243971 A1 | 9/2012 | McCune et al. |
| 2012/0275904 A1 | 11/2012 | McCune et al. |
| 2013/0023378 A1 | 1/2013 | McCune et al. |
| 2014/0133958 A1 | 5/2014 | McCune et al. |
| 2014/0154054 A1 | 6/2014 | Sheridan et al. |
| 2014/0230403 A1 | 8/2014 | Merry et al. |
| 2015/0065285 A1 | 3/2015 | McCune et al. |

FOREIGN PATENT DOCUMENTS

| | | |
|---|---|---|
| EP | 1114949 A2 | 7/2001 |
| EP | 1142850 A1 | 10/2001 |
| EP | 1429005 A2 | 6/2004 |
| EP | 1876338 A2 | 1/2008 |
| EP | 1890054 A1 | 2/2008 |
| EP | 1925855 A2 | 5/2008 |
| EP | 1925856 A2 | 5/2008 |
| EP | 2093407 A2 | 8/2009 |
| EP | 2098704 A2 | 9/2009 |
| EP | 2224100 A2 | 9/2010 |
| EP | 2267338 A1 | 12/2010 |
| EP | 2270361 A2 | 1/2011 |
| EP | 2327859 A2 | 6/2011 |
| EP | 2559913 A1 | 2/2013 |
| EP | 2610463 A2 | 7/2013 |
| FR | 1357038 A | 4/1964 |
| GB | 1516041 A | 6/1978 |
| GB | 2041090 A | 9/1980 |
| GB | 2426792 A | 12/2006 |
| JP | S46036927 | 10/1971 |
| JP | H05248267 A | 9/1993 |
| JP | H09317833 A | 12/1997 |
| JP | 2001208146 A | 8/2001 |
| JP | 3317833 B2 | 8/2002 |
| JP | 3920031 B2 | 5/2007 |
| JP | 4636927 B2 | 2/2011 |
| JP | 2015137649 A | 7/2015 |
| WO | 2007038674 A1 | 4/2007 |
| WO | 2013147951 A1 | 10/2013 |
| WO | 2015017041 A1 | 2/2015 |

OTHER PUBLICATIONS

Guynn, M.D., Berton, J.J., Fisher, K.L., Haller, W.J., Tong, M.T., and Thurman, D.R. (2009). Engine concept study for an advanced single-aisle transport. NASA/TM-2009-215784. pp. 1-97.

Haldenbrand, R. and Norgren, W.M. (1979). Airesearch QCGAT program [quiet clean general aviation turbofan engines]. NASA-CR-159758. pp. 1-199.

Hall, C.A. and Crichton, D. (2007). Engine design studies for a silent aircraft. Journal of Turbomachinery, 129, 479-487.

Han, J., Dutta, S., and Ekkad, S.V. (2000). Gas turbine heat transfer and cooling technology. New York, NY: Taylor Francis. pp. 1-25, 129-157, and 160-249.

Haque, A. and Shamsuzzoha, M., Hussain, F., and Dean, D. (2003). S20-glass/epoxy polymer nanocomposites: Manufacturing, structures, thermal and mechanical properties. Journal of Composite Materials, 37 (20), 1821-1837.

Hazlett, R.N. (1991). Thermal oxidation stability of aviation turbine fuels. Philadelphia, PA: ASTM. pp. 1-163.

Heidelberg, L.J., and Hall, D.G. (1992). Acoustic mode measurements in the inlet of a model turbofan using a continuously rotating rake. AIAA-93-0598. 31st Aerospace Sciences Meeting. Reno, NV. Jan. 11-14, 1993. pp. 1-30.

Heidelberg, L.J., and Hall, D.G. (1992). Acoustic mode measurements in the inlet of a model turbofan using a continuously rotating rake. NASA-TM-105989. Prepared for the 31st Aerospace Sciences Meeting. Reno, NV. Jan. 11-14, 1993. pp. 1-30.

Heingartner, P., Mba, D., Brown, D. (2003). Determining power losses in the helical gear mesh; Case Study. ASME 2003 Design Engineering Technical Conferences. Chicago, IL. Sep. 2-6, 2003. pp. 1-7.

Hemighaus, G., Boval, T., Bacha, J., Barnes, F., Franklin, M., Gibbs, L., . . . Morris, J. (2007). Aviation fuels: Techincal review. Chevron Products Company. pp. 1-94. Retrieved from: https://www.cgabusinessdesk.com/document/aviation_tech_review.pdf.

Hendricks, E.S. and Tong, M.T. (2012). Performance and weight estimates for an advanced open rotor engine. NASA/TM-2012-217710. pp 1-13.

Hess, C. (1998). Pratt Whitney develops geared turbofan. Flug Revue 43(7). Oct. 1998.

Hill, P.G., Peterson, C.R. (1965). Mechanics and thermodynamics of propulsion. Addison-Wesley Publishing Company, Inc. pp. 307-308.

Hill, P.G., Peterson, C.R. (1992). Mechanics and thermodynamics of propulsion, 2nd Edition. Addison-Wesley Publishing Company, Inc. pp. 400-406.

Holcombe, V. (2003). Aero-Propulsion Technology (APT) task V low noise ADP engine definition study. NASA CR-2003-212521. Oct. 1, 2003. pp. 1-73.

Honeywell Learjet 31 and 35/36 TFE731-2 to 2C Engine Upgrade Program. Sep. 2005. pp. 1-4.

Honeywell LF502. Jane's Aero-engines, Aero-engines—Turbofan. Feb. 9, 2012.

Honeywell LF502. Jane's Aero-engines, Aero-engines—Turbofan. Aug. 17, 2016.

Honeywell LF507. Jane's Aero-engines, Aero-engines—Turbofan. Feb. 9, 2012.

Honeywell Sabreliner 65 TFE731-3 to -3D Engine Upgrade Program. Oct. 2005. pp. 1-4.

Honeywell TFE731. Jane's Aero-engines, Aero-engines—Turbofan. Jul. 18, 2012.

Honeywell TFE731 Pilot Tips. pp. 1-143.

Honeywell TFE731-5AR to -5BR Engine Conversion Program. Sep. 2005. pp. 1-4.

Horikoshi, S. and Serpone, N. (2013). Introduction to nanoparticles. Microwaves in nanoparticle synthesis. Wiley-VCH Verlag GmbH & Co. KGaA. pp. 1-24.

Howard, D.F. (1976). QCSEE preliminary under the wing flight propulsion system analysis report. NASA CR-134868. Feb. 1, 1976. pp. 1-260.

Howe, D.C. and Wynosky, T.A. (1985). Energy efficient engine program advanced turbofan nacelle definition study. NASA CR-174942. May 1, 1985. pp. 174.

Howe, D.C., and Wynosky, T.A. (1985). Energy efficient engine program advanced turbofan nacelle definition study. NASA-CR-174942. May 1985. University of Washington dated Dec. 13, 1990. pp. 1-14.

(56) References Cited

OTHER PUBLICATIONS

Howe, D.C., and Wynosky, T.A. (1985). Energy efficient engine program advanced turbofan nacelle definition study. NASA-CR-174942. May 1985. pp. 1-60.
Huang, H., Sobel, D.R., and Spadaccini, L.J. (2002). Endothermic heat-sink of hydrocarbon fuels for scramjet cooling. AIAA/ASME/SAE/ASEE, Jul. 2002. pp. 1-7.
Hughes, C. (2002). Aerodynamic performance of scale-model turbofan outlet guide vanes designed for low noise. Prepared for the 40th Aerospace Sciences Meeting and Exhibit. Reno, NV. NASA/TM-2001-211352. Jan. 14-17, 2002. pp. 1-38.
Hughes, C. (2010). Geared turbofan technology. NASA Environmentally Responsible Aviation Project. Green Aviation Summit. NASA Ames Research Center. Sep. 8-9, 2010. pp. 1-8.
International Preliminary Report on Patentability for PCT Application No. PCT/US2012/071906, dated on Jul. 24, 2014, 7 pages.
International Preliminary Report on Patentability for PCT Application No. PCT/US2013/023356, dated on Aug. 14, 2014, 10 pages.
International Search Report and Written Opinion for PCT Application No. PCT/US2012/071906, dated on Aug. 22, 2013, 12 pages.
Ivchenko-Progress AI-727M. Jane's Aero-engines, Aero-engines—Turbofan. Nov. 27, 2011.
Ivchenko-Progress D-436. Jane's Aero-engines, Aero-engines—Turbofan. Feb. 8, 2012.
Ivchenko-Progress D-727. Jane's Aero-engines, Aero-engines—Turbofan. Feb. 7, 2007.
Jacobson, N.S. (1993). Corrosion of silicon-based ceramics in combustion environments. J. Am. Ceram. Soc. 76 (1). pp. 3-28.
Japanese Office Action for JP2007-202444 mailed on Aug. 3, 2010.
Jeng, Y.-L., Lavernia, E.J. (1994). Processing of molybdenum disilicide. J. of Mat. Sci. vol. 29. 1994. pp. 2557-2571.
Johnston, R.P. and Hemsworth, M.C. (1978). Energy efficient engine preliminary design and integration studies. Jun. 1, 1978. pp. 1-28.
Johnston, R.P., Hirschkron, R., Koch, C.C., Neitzel, R.E., and Vinson, P.W. (1978). Energy efficient engine: Preliminary design and integration study—final report. NASA CR-135444. Sep. 1978. pp. 1-401.
Jorgensen, P.J., Wadsworth, M.E., and Cutler, I.B. (1961). Effects of water vapor on oxidation of silicon carbide. J. Am. Ceram. Soc. 44(6). pp. 248-261.
Kahn, H., Tayebi, N., Ballarini, R., Mullen, R.L., Heuer, A.H. (2000). Fracture toughness of polysilicon MEMS devices. Sensors and Actuators vol. 82. 2000. pp. 274-280.
Kandebo, S.W. (1998). Geared-Turbofan engine design targets cost, complexity. Aviation Week Space Technology, 148(8). p. 34-5.
Kandebo, S.W. (1998). Pratt Whitney launches geared turbofan engine. Aviation Week Space Technology, 148(8). p. 32-4.
Kaplan, B., Nicke, E., Voss, C. (2006), Design of a highly efficient low-noise fan for ultra-high bypass engines. Proceedings of GT2006 for ASME Turbo Expo 2006: Power for Land, Sea and Air. Barcelona, SP. May 8-11, 2006. pp. 1-10.
Kasuba, R. and August, R. (1984). Gear mesh stiffness and load sharing in planetary gearing. American Society of Mechanical Engineers, Design Engineering Technical Conference, Cambridge, MA. Oct. 7-10, 1984. pp. 1-6.
Notice of Opposition for European Patent No. 3456940 (18203501.4) dated May 11, 2021 by Safran Aircraft Engines.
Notice of Opposition of European Patent No. EP2610464 (Application No. 12198045.2) by Safran Aircraft Engines dated Aug. 7, 2019, 53 pages.
Notice of Opposition to European Patent No. EP2610463, United Technologies Corporation opposed by Safran Aircraft Engines, dated Aug. 3, 2016, 95 pages.
Oates, G.C. (Ed) (1989). Aircraft propulsion systems and technology and design. Washington, D.C.: American Institute of Aeronautics, Inc. pp. 341-344.
Parametric study of STOL short-haul transport engine cycles and operational techniques to minimize community noise impact. NASA-CR-114759. Jun. 1, 1974. pp. 1-397.
Parker, R.G. and Lin, J. (2001). Modeling, modal properties, and mesh stiffness variation instabilities of planetary gears. Prepared for NASA. NASA/CR-2001-210939. May 2001. pp. 1-111.
Petition for Inter Partes Review of U.S. Pat. No. 8,894,538, *General Electric Company, Petitioner*, v. *United Technologies Corporation*, Patent Owner, Filed Mar. 1, 2017, 64 pages.
Petrovic, J.J., Castro, R.G., Vaidya, R.U., Peters, M.I., Mendoza, D., Hoover, R.C., and Gallegos, D.E. (2001). Molybdenum disilicide materials for glass melting sensor sheaths. Ceramic Engineering and Science Proceedings. vol. 22(3). 2001. pp. 59-64.
Press release. The GE90 engine. Retreived from: https://www.geaviation.com/commercial/engines/ge90-engine; https://www.geaviation.com/press-release/ge90-engine-family/ge90-115b-fan-completing-blade-testing-schedule-first-engine-test; and https://www.geaviation.com/press-release/ge90-engine-family/ge'scomposite-fan-blade-revolution-turns-20-years-old.
Product Brochure. Garrett TFE731. Allied Signal. Copyright 1987. pp. 1-24.
Pyrograf-III Carbon Nanofiber. Product guide. Retrieved Dec. 1, 2015 from: http://pyrografproducts.com/Merchant5/merchant.mvc?Screen=cp_nanofiber.
QCSEE ball spline pitch-change mechanism whirligig test report. (1978). NASA-CR-135354. Sep. 1, 1978. pp. 1-57.
QCSEE hamilton standard cam/harmonic drive variable pitch fan actuation system derail design report. (1976). NASA-CR-134852. Mar. 1, 1976. pp. 1-172.
QCSEE main reduction gears bearing development program final report. (1975). NASA-CR-134890. Dec. 1, 1975. pp. 1-41.
QCSEE over-the-wing final design report. (1977). NASA-CR-134848. Jun. 1, 1977. pp. 1-460.
QCSEE over-the-wing propulsion system test report vol. III—mechanical performance. (1978). NASA-CR-135325. Feb. 1, 1978. pp. 1-112.
QCSEE Preliminary analyses and design report. vol. 1. (1974). NASA-CR-134838. Oct. 1, 1974. pp. 1-337.
QCSEE preliminary analyses and design report. vol. II. (1974). NASA-CR-134839. Oct. 1, 1974. pp. 340-630.
QCSEE the aerodynamic and mechanical design of the QCSEE under-the-wing fan. (1977). NASA-CR-135009. Mar. 1, 1977. pp. 1-137.
QCSEE the aerodynamic and preliminary mechanical design of the QCSEE OTW fan. (1975). NASA-CR-134841. Feb. 1, 1975. pp. 1-74.
QCSEE under-the-wing engine composite fan blade design. (1975). NASA-CR-134840. May 1, 1975. pp. 1-51.
QCSEE under-the-wing engine composite fan blade final design test report. (1977). NASA-CR-135046. Feb. 1, 1977. pp. 1-55.
QCSEE under-the-wing engine composite fan blade preliminary design test report. (1975). NASA-CR-134846. Sep. 1, 1975. pp. 1-56.
QCSEE under-the-wing engine digital control system design report. (1978). NASA-CR-134920. Jan. 1, 1978. pp. 1-309.
Quiet clean general aviation turbofan (QCGAT) technology study final report vol. I. (1975). NASA-CR-164222. Dec. 1, 1975. pp. 1-186.
Ramsden, J.M. (Ed). (1978). The new European airliner. Flight International, 113(3590). Jan. 7, 1978. pp. 39-43.
Ratna, D. (2009). Handbook of thermoset resins. Shawbury, UK: iSmithers. pp. 187-216.
Rauch, D. (1972). Design study of an air pump and integral lift engine ALF-504 using the Lycoming 502 core. Prepare for NASA. Jul. 1972. pp. 1-182.
Reshotko, M., Karchmer, A., Penko, P.F. and Mcardle, J.G. (1977). Core noise measurements on a YF-102 turbofan engine. NASA TM X-73587. Prepared for Aerospace Sciences Meeting sponsored by the American Institute of Aeronautics and Astronautics. Jan. 24-26, 2977.
Reynolds, C.N. (1985). Advanced prop-fan engine technology (APET) single- and counter-rotation gearbox/pitch change mechanism. Prepared for NASA. NASA CR-168114 (vol. I). Jul. 1985. pp. 1-295.
Riegler, C., and Bichlmaier, C. (2007). The geared turbofan technology—Opportunities, challenges and readiness status. Porceedings CEAS. Sep. 10-13, 2007. Berlin, Germany. pp. 1-12.

(56) References Cited

OTHER PUBLICATIONS

Rolls-Royce M45H. Jane's Aero-engines, Aero-engines—Turbofan. Feb. 24, 2010.
Rotordynamic instability problems in high-performance turbomachinery. (1986). NASA conference publication 2443. Jun. 2-4, 1986.
Roux, E. (2007). Turbofan and turbojet engines database handbook. Editions Elodie Roux. Blagnac: France, pp. 1-595.
Salemme, C.T. and Murphy, G.C. (1979). Metal spar/superhybrid shell composite fan blades. Prepared for NASA. NASA-CR-159594. Aug. 1979. pp. 1-127.
Sargisson, D.F. (1985). Advanced propfan engine technology (APET) and single-rotation gearbox/pitch change mechanism. NASA Contractor Report-168113. R83AEB592. Jun. 1, 1985. pp. 1-476.
Savelle, S.A. and Garrard, G.D. (1996). Application of transient and dynamic simulations to the U.S. Army T55-L-712 helicopter engine. The American Society of Mechanical Engineers. Presented Jun. 10-13, 1996. pp. 1-8.
Schaefer, J.W., Sagerser, D.R., and Stakolich, E.G. (1977). Dynamics of high-bypass-engine thrust reversal using a variable-pitch fan. Technical Report prepared for NASA. NASA-TM-X-3524. May 1, 1977. pp. 1-33.
Seader, J.D. and Henley, E.J. (1998). Separation process principles. New York, NY: John Wiley Sons, Inc. pp. 722-726 and 764-771.
Shah, D.M. (1992). MoSi2 and other silicides as high temperature structural materials. Superalloys 1992. The Minerals, Metals, Materials Society. pp. 409-422.
Shorter Oxford English Dictionary, 6th Edition. (2007), vol. 2, N-Z, pp. 1888.
Silverstein, C.C., Gottschlich, J.M., and Meininger, M. The feasibility of heat pipe turbine vane cooling. Presented at the International Gas Turbine and Aeroengine Congress and Exposition, The Hague, Netherlands. Jun. 13-16, 1994.pp. 1-7.
Singh, A. (2005). Application of a system level model to study the planetary load sharing behavior. Jounal of Mechanical Design. vol. 127. May 2005. pp. 469-476.
Singh, B. (1986). Small engine component technology (SECT) study. NASA CR-175079. Mar. 1, 1986. pp. 1-102.
Singh, R. and Houser, D.R. (1990). Non-linear dynamic analysis of geared systems. NASA-CR-180495. Feb. 1, 1990. pp. 1-263.
Smith, C.E., Hirschkron, R., and Warren, R.E. (1981). Propulsion system study for small transport aircraft technology (STAT). Final report. NASA-CR-165330. May 1, 1981. pp. 1-216.
Smith-Boyd, L. and Pike, J. (1986). Expansion of epicyclic gear dynamic analysis program. Prepared for NASA. NASA CR-179563. Aug. 1986. pp. 1-98.
Sowers, H.D. and Coward, W.E. (1978). QCSEE over-the-wing (OTW) engine acuostic design. NASA-CR-135268. Jun. 1, 1978. pp. 1-52.
Spadaccini, L.J., and Huang, H. (2002). On-line fuel deoxygenation for coke suppression. ASME, Jun. 2002. pp. 1-7.
Spadaccini, L.J., Sobel, D.R., and Huang, H. (2001). Deposit formation and mitigation in aircraft fuels. Journal of Eng. For Gas Turbine and Power, vol. 123. Oct. 2001. pp. 741-746.
Declaration of John Eaton, Ph.D. In re U.S. Pat. No. 8,689,568, Executed Mar. 28, 2016, pp. 1-87.
Declaration of Reza Abhari, In re U.S. Pat. No. 8,448,895, Executed Nov. 28, 2016, pp. 1-81.
Declaration of Reza Abhari. In re U.S. Pat. No. 8,695,920, claims 1-4, 7-14, 17 and 19, Executed Nov. 29, 2016, pp. 1-102.
Declaration of Reza Abhari. In re U.S. Pat. No. 8,695,920. Executed Nov. 30, 2016, pp. 1-67.
Declaration of Reza Abhari, Ph.D. In re U.S. Pat. No. 8,844,265, Executed Jun. 28, 2016, pp. 1-91.
Defeo, A. and Kulina, M. (1977). Quiet clean short-haul experimental engine (QCSEE) main reduction gears detailed design final report. Prepared for NASA. NASA-CR-134872. Jul. 1977. pp. 1-157.
Dickey, T.A. and Dobak, E.R. (1972). The evolution and development status of ALF 502 turbofan engine. National Aerospace Engineering and Manufacturing Meeting. San Diego, California. Oct. 2-5, 1972. pp. 1-12.
Drago, R.J. (1974). Heavy-lift helicopter brings up drive ideas. Power Transmission Design. Mar. 1987. pp. 1-15.
Drago, R.J. and Margasahayam, R.N. (1987). Stress analysis of planet gears with integral bearings; 3D finite-element model development and test validation. 1987 MSC NASTRAN World Users Conference. Los Angeles, CA. Mar. 1987. pp. 1-14.
Dudley, D.W., Ed. (1954). Handbook of practical gear design. Lancaster, PA: Technomic Publishing Company, Inc. pp. 3.96-102 and 8.12-18.
Dudley, D.W., Ed. (1962). Gear handbook. New York, NY: McGraw-Hill. pp. 14-17 (TOC, Preface, and Index).
Dudley, D.W., Ed. (1962). Gear handbook. New York, NY: McGraw-Hill. pp. 3.14-18 and 12.7-12.21.
Dudley, D.W., Ed. (1994). Practical gear design. New York, NY: McGraw-Hill. pp. 119-124.
Dudley D.W., "Gear Handbook: The Design, Manufacture, and Application of Gears", First Edition, 1962, pp. (3-14)-(3-15).
Edkins, D.P., Hirschkron, R., and Lee, R. (1972). TF34 turbofan quiet engine study. Final Report prepared for NASA. NASA-CR-120914. Jan. 1, 1972. pp. 1-99.
Edwards, T. and Zabarnick, S. (1993). Supercritical fuel deposition mechanisms. Ind. Eng. Chem. Res. vol. 32. 1993. pp. 3117-3122.
El-Sayad, A.F. (2008). Aircraft propulsion and gas turbine engines. Boca Raton, FL: CRC Press. pp. 215-219 and 855-860.
European Search Report and Written Opinion for Application No. EP12198136, dated on Aug. 21, 2013, 6 pages.
European Search Report for Application No. EP07253078.5 dated Nov. 22, 2007.
European Search Report for Application No. EP12198045.2 dated Sep. 7, 2015.
European Search Report for Application No. EP16174068.3 dated Nov. 15, 2016.
European Search Report for Application No. EP16183877.6 dated Dec. 23, 2016.
European Search Report for Application No. EP18203501.4 dated Feb. 11, 2019.
European Search Report for Application No. EP19205494.8 dated Dec. 18, 2019.
European Search Report for European Patent Application No. 20191611.1, completed Dec. 7, 2020, 9 pages.
European Search Report for European Patent Application No. 20211628.1 completed Apr. 1, 2021.
Extended European Search Report for Application No. EP16171476 dated Sep. 28, 2016.
Faghri, A. (1995). Heat pipe and science technology. Washington, D.C.: Taylor & Francis. pp. 1-60.
Falchetti, F., Quiniou, H., and Verdier, L. (1994). Aerodynamic design and 3D Navier-Stokes analysis of a high specific flow fan. ASME. Presented at the International Gas Turbine and Aeroengine Congress and Exposition. The Hague, Netherlands. Jun. 13-16, 1994. pp. 1-10.
File History for U.S. Appl. No. 12/131,876.
Fisher, K., Berton, J., Guynn, M., Haller B., Thurman, D., and Tong, M. (2012). NASA's turbofan engine concept study for a next-generation single-aisle transport. Presentation to ICAO's noise technology independent expert panel. Jan. 25, 2012. pp. 1-23.
Fledderjohn, K.R. (1983). The TFE731-5: Evolution of a decade of business jet service. SAE Technical Paper Series. Business Aircraft Meeting Exposition. Wichita, Kansas. Apr. 12-15, 1983. pp. 1-12.
Frankenfeld, J.W. and Taylor, W.F. (1980). Deposit fromation from deoxygenated hydrocarbons. 4. Studies in pure compound systems. Ind. Eng. Chem., Prod. Res. Dev., vol. 19(1). 1978. pp. 65-70.
Garret TFE731 Turbofan Engine (Cat C). Chapter 79: Lubrciation System. TTFE731 Issue 2. 2010. pp. 1-24.
Gates, D. Bombardier flies at higher market. Seattle Times. Jul. 13, 2008. pp. C6.
Gibala, R., Ghosh, A.K., Van Aken, D.C., Srolovitz, D.J., Basu, A., Chang, H., . . . Yang, W. (1992). Mechanical behavior and interface

(56) References Cited

OTHER PUBLICATIONS design of MoSi2-based alloys and composites. Materials Science and Engineering, A155, 1992. pp. 147-158.
Gliebe, P.R. and Janardan, B.A. (2003). Ultra-high bypass engine aeroacoustic study. NASA/CR-2003-21252. GE Aircraft Engines, Cincinnati, Ohio. Oct. 2003. pp. 1-103.
Gliebe, P.R., Ho, P.Y., and Mani, R. (1995). UHB engine fan and broadband noise reduction study. NASA CR-198357. Jun. 1995. pp. 1-48.
Grady, J.E., Weir, D.S., Lamoureux, M.C., and Martinez, M.M. (2007). Engine noise research in NASA's quiet aircraft technology project. Papers from the International Symposium on Air Breathing Engines (ISABE). 2007.
Gray, D.E. (1978). Energy efficient engine preliminary design and integration studies. NASA-CP-2036-PT-1. Nov. 1978. pp. 89-110.
Gray, D.E. (1978). Energy efficient engine preliminary design and integration studies. Prepared for NASA. NASA CR-135396. Nov. 1978. pp. 1-366.
Gray, D.E. and Gardner, W.B. (1983). Energy efficient engine program technology benefit/cost study—vol. 2. NASA CR-174766. Oct. 1983. pp. 1-118.
Gray D.E., "Energy Efficient Engine: Preliminary design and integration studies", Jun. 1, 1978, 22 pages.
Greitzer, E.M., Bonnefoy, P.A., Delaroseblanco, E., Dorbian, C.S., Drela, M., Hall, D.K., Hansman, R.J., Hileman, J.I., Liebeck, R.H., Levegren, J. (2010). N+3 aircraft concept designs and trade studies, final report. vol. 1. Dec. 1, 2010. NASA/CR-2010-216794/vol. 1. pp. 1-187.
Griffiths, B. (2005). Composite fan blade containment case. Modern Machine Shop. Retrieved from: http://www.mmsonline.com/articles/composite-fan-blade-containment-case pp. 1-4.
Groweneweg, J.F. (1994). Fan noise research at NASA. NASA-TM-106512. Prepared for the 1994 National Conference on Noise Control Engineering. Fort Lauderdale, FL. May 1-4, 1994. pp. 1-10.
Groweneweg, J.F. (1994). Fan noise research at NASA. Noise-CON 94. Fort Lauderdale, FL. May 1-4, 1994. pp. 1-10.
Gunston, B. (Ed.) (2000). Jane's aero-engines, Issue seven. Coulsdon, Surrey, UK: Jane's Information Group Limited. pp. 510-512.
Gunston, B. (Ed.)(2000). Jane's aero-engines. Jane's Information Group Inc. VA: Alexandria. Issue Seven pp. 1-47 and 510-512.
Guynn, M. D., Berton, J.J., Fisher, K. L., Haller, W.J., Tong, M. T., and Thurman, D.R. (2009). Analysis of turbofan design options for an advanced single-aisle transport aircraft. American Institute of Aeronautics and Astronautics. pp. 1-13.
2003 NASA seal/secondary air system workshop. (2003). NASA/CP-2004-212963/vol. 1. Sep. 1, 2004. pp. 1-408.
About Gas Turb. Retrieved Jun. 26, 2018 from: http://gasturb.de/about-gasturb.html.
Adamson, A.P. (1975). Quiet Clean Short-Haul Experimental Engine (QCSEE) design rationale. Society of Automotive Engineers. Air Transportation Meeting. Hartford, CT. May 6-8, 1975. pp. 1-9.
Aerospace Information Report. (2008). Advanced ducted propulsor in-flight thrust determination. SAE International AIR5450. Aug. 2008. p. 1-392.
Agarwal, B.D and Broutman, L.J. (1990). Analysis and performance of fiber composites, 2nd Edition. John Wiley & Sons, Inc. New York: New York. pp. 1-11, 13-23, 26-33, 50-501, 56-58, 60-61, 64-71, 87-89, 324-329, 436-437.
AGMA Standard (1997). Design and selection of components for enclosed gear drives. lexandria, VA: American Gear Manufacturers Association. pp. 1-48.
AGMA Standard (1999) Flexible couplings—Mass elastic properties and other characteristics. Alexandria, VA: American Gear Manufacturers Association. pp. 1-46.
AGMA Standard (2006). Design manual for enclosed epicyclic gear drives. Alexandria, VA: American Gear Manufacturers Association. pp. 1-104.
Ahmad, F. and Mizramoghadam, A.V. (1999). Single v. two stage high pressure turbine design of modern aero engines. ASME.

Prestend at the International Gast Turbine Aeroengine Congress Exhibition. Indianapolis, Indiana. Jun. 7-10, 1999. pp. 1-9.
Amezketa, M., Iriarte, X., Ros, J., and Pintor, J. (2009). Dynamic model of a helical gear pair with backlash and angle—varying mesh stiffness. Multibody Dynamics 2009, ECCOMAS Thematic Conference. 2009. pp. 1-36.
Anderson, N.E., Loewenthal, S.H., and Black, J.D. (1984). An analytical method to predict efficiency of aircraft gearboxes. NASA Technical Memorandum prepared for the Twentieth Joint Propulsion Conference. Cincinnati, OH. Jun. 11-13, 1984. pp. 1-25.
Anderson, R.D. (1985). Advanced Propfan Engine Technology (APET) definition study, single and counter-rotation gearbox/pitch change mechanism design. NASA CR-168115. Jul. 1, 1985. pp. 1-289.
Avco Lycoming Divison. ALF 502L Maintenance Manual. Apr. 1981. pp. 1-118.
Aviadvigatel D-110. Jane's Aero-engines, Aero-engines—Turbofan. Jun. 1, 2010.
Awker, R.W. (1986). Evaluation of propfan propulsion applied to general aviation. NASA CR-175020. Mar. 1, 1986. pp. 1-140.
Baker, R.W. (2000). Membrane technology and applications. New York, NY: McGraw-Hill. pp. 87-153.
Berton, J.J. and Guynn, M.D. (2012). Multi-objective optimization of a turbofan for an advanced, single-aisle transport. NASA/TM-2012-217428. pp. 1-26.
Bessarabov, D.G., Jacobs, E.P., Sanderson, R.D., and Beckman, I.N. (1996). Use of nonporous polymeric flat-sheet gas-separation membranes in a membrane-liquid contactor: experimental studies. Journal of Membrane Sciences, vol. 113. 1996. pp. 275-84.
Bloomer, H.E. and Loeffler, I.J. (1982). QCSEE over-the-wing engine acoustic data. NASA-TM-82708. May 1, 1982. pp. 1-558.
Bloomer, H.E. and Samanich, N.E. (1982). QCSEE under-the-wing engine acoustic data. NASA-TM-82691. May 1, 1982. pp 1-28.
Bloomer, H.E. and Samanich, N.E. (1982). QCSEE under-the-wing enging-wing-flap aerodynamic profile characteristics. NASA-TM-82890. Sep. 1, 1982. pp. 1-48.
Bloomer, H.E., Loeffler, I.J., Kreim, W.J., and Coats, J.W. (1981). Comparison of NASA and contractor reslts from aeroacoustic tests of QCSEE OTW engine. NASA Technical Memorandum 81761. Apr. 1, 1981. pp. 1-30.
Bornstein, N. (1993). Oxidation of advanced intermetallic compounds. Journal de Physique IV, 1993, 03 (C9), pp. C9-367-C9-373.
Brennan, P.J. and Kroliczek, E.J. (1979). Heat pipe design handbook. Prepared for National Aeronautics and Space Administration by B K Engineering, Inc. Jun. 1979. pp. 1-348.
Brines, G.L. (1990). The turbofan of tomorrow. Mechanical Engineering: The Journal of the American Society of Mechanical Engineers, 108(8), 65-67.
Bucknell, R.L. (1973). Influence of fuels and lubricants on turbine engine design and performance, fuel and lubircant analyses. Final Technical Report, Mar. 1971-Mar. 1973. pp. 1-252.
Bunker, R.S. (2005). A review of shaped hole turbine film-cooling technology. Journal of Heat Transfer vol. 127. Apr. 2005. pp. 441-453.
Carney, K., Pereira, M. Revilock, and Matheny, P. (2003). Jet engine fan blade containment using two alternate geometries. 4th European LS-DYNA Users Conference. pp. 1-10.
Chapman J.W., et al., "Control Design for an Advanced Geared Turbofan Engine", AIAA Joint Propulsion Conference 2017, Jul. 10, 2017- Jul. 12, 2017, Atlanta, GA, pp. 1-12.
Cheryan, M. (1998). Ultrafiltration and microfiltration handbook. Lancaster, PA: Tecnomic Publishing Company, Inc. pp. 171-236.
Ciepluch, C. (1977). Quiet clean short-haul experimental engine (QCSEE) under-the-wing (UTW) final design report. Prepared for NASA. NASA-CP-134847. Retreived from: https://ntrs.nasa.gov/archive/nasa/casi.ntrs.nasa.gov/19800075257.pdf.
Clarke, D.R. and Levi, C.G. (2003). Materials design for the next generation thermal barrier coatings. Annual. Rev. Mater. Res. vol. 33. 2003. pp. 383-417.
Cramoisi, G. Ed. (2012). Death in the Potomac: The crash of Air Florida Flight 90. Air Crash Investigations. Accident Report NTSB/AAR-82-8. p. 45-47.

(56) References Cited

OTHER PUBLICATIONS

Cusick, M. (1981). Avco Lycoming's ALF 502 high bypass fan engine. Society of Automotive Engineers, Inc. Business Aircraft Meeting Exposition. Wichita, Kansas. Apr. 7-10, 1981. pp. 1-9.
Daggett, D.L., Brown, S.T., and Kawai, R.T. (2003). Ultra-efficient engine diameter study. NASA/CR-2003-212309. May 2003. pp. 1-52.
Dalton, III., W.N. (2003). Ultra high bypass ratio low noise engine study. NASA/CR-2003-212523. Nov. 2003. pp. 1-187.
Daly, M. Ed. (2008). Jane's Aero-Engine. Issue Twenty-three. Mar. 2008. p. 707-12.
Daly, M. Ed. (2010). Jane's Aero-Engine. Issue Twenty-seven. Mar. 2010. p. 633-636.
Damerau, J. (2014) What is the mesh stiffness of gears Screen shot of query submitted by Vahid Dabbagh, answered by Dr. Jochan Damerau, Research General Managerat Bosch Corp., Japan. Retrieved from: https://www.researchgate.net/post/What_is_the_mesh_stiffness_of_gears.
Darrah, S. (1987). Jet fuel deoxygenation. Interim Report for Period Mar. 1987-Jul. 1988. pp. 1-22.
Dassault Falcon 900EX Easy Systems Summary. Retrieved from: http://www.smartcockpit.com/docs/F900EX-Engines.pdf pp. 1-31.
Datasheet. CF6-80C2 high-bypass turbofan engines. Retreived from https://geaviation.com/sites/default/files/datasheet-CF6-80C2.pdf.
Datasheet. CFM56-5B for the Airbus A320ceo family and CFM56-7B for the Boeing 737 family. https://www.cfmaeroengines.com/.
Datasheet. Genx™ high bypass turbofan engines. Retreived from: https://www.geaviation.com/sites/default/files/datasheet-genx.pdf.
Davies, D. and Miller, D.C. (1971). A variable pitch fan for an ultra quiet demonstrator engine. 1976 Spring Convention: Seeds for Success in Civil Aircraft Design in the Next Two Decades. pp. 1-18.
Davis, D.G.M. (1973). Variable-pitch fans: Progress in Britain. Flight International. Apr. 19, 1973. pp. 615-617.
Decision Institution of Inter Partes Review, *General Electric Company*, Petitioner v. *United Technologies Corporation*, Patent Owner, IPR2017-01001, U.S. Pat. No. 8,894,538, Entered Jul. 10, 2017, pp. 1-4.
Decker, S. and Clough, R. (2016). GE wins shot at voiding pratt patent in jet-engine clash. Bloomberg Technology. Retrieved from: https://www.bloomberg.com/news/articles/2016-06-30/ge-wins-shot-to-invalidate-pratt-airplane-engine-patent-in-u-s.
Declaration of Dr. Magdy Attia, In re U.S. Pat. No. 8,313,280, Executed Oct. 21, 2016, pp. 1-88.
Declaration of Dr. Magdy Attia, In re U.S. Pat. No. 8,517,668, Executed Dec. 8, 2016, pp. 1-81.
Kerrebrock, J.L. (1977). Aircraft engines and gas turbines. Cambridge, MA: The MIT Press, p. 11.
Knip, Jr., G. (1987). Analysis of an advanced technology subsonic turbofan incorporating revolutionary materials. NASA Technical Memorandum. May 1987. pp. 1-23.
Kojima, Y., Usuki, A. Kawasumi, M., Okada, A., Fukushim, Y., Kurauchi, T., and Kamigaito, O. (1992). Mechanical properties of nylon 6-clay hybrid. Journal of Materials Research, 8(5), 1185-1189.
Kollar, L.P. and Springer, G.S. (2003). Mechanics of composite structures. Cambridge, UK: Cambridge University Press, p. 465.
Krantz, T.L. (1990). Experimental and analytical evaluation of efficiency of helicopter planetary stage. NASA Technical Paper. Nov. 1990. pp. 1-19.
Krenkel, W., Naslain, R., and Schneider, H. Eds. (2001). High temperature ceramic matrix composites pp. 224-229. Weinheim, DE: Wiley-VCH Verlag GmbH.
Kurzke, J. (2001). GasTurb 9: A program to calculate design and off-design performance of gas turbines. Retrieved from: https://www.scribd.com/document/92384867/GasTurb9Manual.
Kurzke, J. (2008). Preliminary Design, Aero-engine design: From state of the art turbofans towards innovative architectures. pp. 1-72.
Kurzke, J. (2009). Fundamental differences between conventional and geared turbofans. Proceedings of ASME Turbo Expo: Power for Land, Sea, and Air 2009, Orlando, Florida. pp. 145-153.
Kurzke, J. (2012). Gas Turb 12: Design and off-design performance of gas turbines. Retrieved from: https://www.scribd.com/document/153900429/Gas Turb-12.
Langston, L. and Faghri, A. Heat pipe turbine vane cooling. Prepared for Advanced Turbine Systems Annual Program Review. Morgantown, West Virginia. Oct. 17-19, 1995. pp. 3-9.
Lau, K., Gu, C., and Hui, D. (2005). A critical review on nanotube and nanotube/nanoclay related polymer composite materials. Composites: Part B 37(2006) 425-436.
Leckie, F.A. and Dal Bello, D.J. (2009). Strength and stiffness of engineering systems. Mechanical Engineering Series. Springer. pp. 1-10, 48-51.
Leckie F.A., et al., "Strength and Stiffness of Engineering Systems," Mechanical Engineering Series, Springer, 2009, pp. 1-3.
Lee, K.N. (2000). Current status of environmental barrier coatings for Si-Based ceramics. Surface and Coatings Technology 133-134, 2000. pp. 1-7.
Levintan, R.M. (1975). Q-Fan demonstrator engine. Journal of Aircraft. vol. 12( 8). Aug. 1975. pp. 658-663.
Lewicki, D.G., Black, J.D., Savage, M., and Coy, J.J. (1985). Fatigue life analysis of a turboprop reduction gearbox. NASA Technical Memorandum. Prepared for the Design Technical Conference (ASME). Sep. 11-13, 1985. pp. 1-26.
Liebeck, R.H., Andrastek, D.A., Chau, J., Girvin, R., Lyon, R., Rawdon, B.K., Scott, P.W et al. (1995). Advanced subsonic airplane design economics studies. NASA CR-195443. Apr. 1995. pp. 1-187.
Litt, J.S. (2018). Sixth NASA Glenn Research Center propulsion control and diagnostics (PCD) workshop. NASA/CP-2018-219891. Apr. 1, 2018. pp. 1-400.
Lord, W.K., MacMartin, D.G., and Tillman, T.G. (2000). Flow control opportunities in gas turbine engines. American Institute of Aeronautics and Astronautics. pp. 1-15.
Lynwander, P. (1983). Gear drive systems: Design and application. New York, New York: Marcel Dekker, Inc. pp. 145, 355-358.
Macisaac, B. and Langston, R. (2011). Gas turbine propulsion systems. Chichester, West Sussex: John Wiley Sons, Ltd. pp. 260-265.
Mancuso, J.R. and Corcoran, J.P. (2003). What are the differences in high performance flexible couplings for turbomachinery Proceedings of the Thirty-Second Turbomachinery Symposium. 2003. pp. 189-207.
Manual. Student's Guide to Learning SolidWorks Software. Dassault Systemes—SolidWorks Corporation. pp. 1-156.
Matsumoto, T., Toshiro, U., Kishida, A., Tsutomu, F., Maruyama, I., and Akashi, M. (1996). Novel functional polymers: Poly (dimethylsiloxane)-polyamide multiblock copolymer. VII. Oxygen permeability of aramid-silicone membranes in a gas-membrane-liquid system. Journal of Applied Polymer Science, vol. 64(6). May 9, 1997. pp. 1153-1159.
Mattingly, J.D. (1996). Elements of gas turbine propulsion. New York, New York: McGraw-Hill, Inc. pp. 1-18, 60-62, 223-234, 462-479, 517-520, 757-767, and 862-864.
Mattingly, J.D. (1996). Elements of gas turbine propulsion. New York, New York: McGraw-Hill, Inc. pp. 1-18, 60-62, 85-87, 95-104, 121-123, 223-234, 242-245, 278-285, 303-309, 323-326, 462-479, 517-520, 563-565, 630-632, 668-670, 673-675, 682-685, 697-705, 726-727, 731-732, 802-805, 828-830 and appendices.
Mattingly, J.D. (1996). Elements of gas turbine propulsion. New York, New York: McGraw-Hill, Inc. pp. 1-18, 60-62, 85-87, 95-104, 121-123, 223-234, 242-245, 278-285, 303-309, 323-326, 462-479, 517-520, 563-565, 630-632, 673-675, 682-685, 697-699, 703-705, 802-805, 862-864, and 923-925.
Mattingly, J.D. (1996). Elements of gas turbine propulsion. New York, New York: McGraw-Hill, Inc. pp. 8-15.
Mavris, D.N., Schutte, U.S. (2016). Application of deterministic and probabilistic system design methods and enhancements of conceptual design tools for ERA project final report. NASA/CR-2016-219201. May 1, 2016. pp. 1-240.
McArdle, J.G. and Moore, A.S. (1979). Static test-stand performance of the YF-102 turobfan engine with several exhaust configurations for the Quiet Short-Haul Research Aircraft (QSRA). Prepared for NASA. NASA-TP-1556. Nov. 1979. pp. 1-68.

(56) References Cited

OTHER PUBLICATIONS

McCracken, R.C. (1979). Quiet short-haul research aircraft familiarization document. NASA-TM-81149. Nov. 1, 1979. pp. 1-76.

McCune, M.E. (1993). Initial test results of 40,000 horsepower fan drive gear system for advanced ducted propulsion systems. AIAA 29th Joint Conference and Exhibit. Jun. 28-30, 1993. pp. 1-10.

McMillian, A. (2008) Material development for fan blade containment casing. Abstract. p. 1. Conference on Engineering and Physics: Synergy for Success 2006. Journal of Physics: Conference Series vol. 105. London, UK. Oct. 5, 2006.

Meier N. (2005) Civil Turbojet/Turbofan Specifications. Retrieved from http://jet-engine.net/civtfspec.html.

Merriam-Webster's collegiate dictionary, 10th Ed. (2001). p. 1125-1126.

Merriam-Webster's collegiate dictionary, 11th Ed. (2009). p. 824.

Meyer, A.G. (1988). Transmission development of TEXTRON Lycoming's geared fan engine. Technical Paper. Oct. 1988. pp. 1-12.

Middleton, P. (1971). 614: VFW's jet feederliner. Flight International, Nov. 4, 1971. p. 725, 729-732.

Misel, O.W. (1977). QCSEE main reduction gears test program. NASA CR-134669. Mar. 1, 1977. pp. 1-222.

Moxon, J. How to save fuel in tomorrow's engines. Flight International. Jul. 30, 1983. 3873(124). pp. 272-273.

Muhlstein, C.L., Stach, E.A., and Ritchie, R.O. (2002). A reaction-layer mechanism for the delayed failure of micron-scale polycrystalline silicon structural films subjected to high-cycle fatigue loading. Acta Materialia vol. 50. 2002. pp. 3579-3595.

Munt, R. (1981). Aircraft technology assessment: Progress in low emissions engine. Technical Report. May 1981. pp. 1-171.

Nanocor Technical Data for Epoxy Nanocomposites using Nanomer 1.30E Nanoclay. Nnacor, Inc. Oct. 2004.

NASA Conference Publication. (1978). CTOL transport technology. NASA-CP-2036-PT-1. Jun. 1, 1978. pp. 1-531.

NASA Conference Publication. Quiet, powered-lift propulsion. Cleveland, Ohio. Nov. 14-15, 1978. pp. 1-420.

Neitzel, R., Lee, R., and Chamay, A.J. (1973). Engine and installation preliminary design. Jun. 1, 1973. pp. 1-333.

Neitzel, R.E., Hirschkron, R. and Johnston, R.P. (1976). Study of unconventional aircraft engines designed for low energy consumption. NASA-CR-135136. Dec. 1, 1976. pp. 1-153.

Newton, F.C., Liebeck, R.H., Mitchell, G.H., Mooiweer, M.A., Platte, M.M., Toogood, T.L., and Wright, R.A. (1986). Multiple Application Propfan Study (MAPS): Advanced tactical transport. NASA CR-175003. Mar. 1, 1986. pp. 1-101.

Norton, M. and Karczub, D. (2003). Fundamentals of noise and vibration analysis for engineers. Press Syndicate of the University of Cambridge. New York: New York. p. 524.

Summons to Attend Oral Proceedings for European Application No. 16183877.6 dated Feb. 9, 2021.

Summons to Attend Oral Proceedings for European Patent Application No. EP12871934.1 dated Jan. 7, 2020.

Sundaram, S.K., Hsu, J-Y., Speyer, R.F. (1994). Molten glass corrosion resistance of immersed combustion-heating tube materials in soda-lime-silicate glass. J. Am. Ceram. Soc. 77(6). pp. 1613-23.

Sundaram, S.K., Hsu, J-Y., Speyer, R.F. (1995). Molten glass corrosion resistance of immersed combustion-heating tube materials in e-glass. J. Am. Ceram. Soc. 78(7). pp. 1940-1946.

Sutliff, D. (2005). Rotating rake turbofan duct mode measurement system. NASA TM-2005-213828. Oct. 1, 2005. pp. 1-34.

Suzuki, Y., Morgan, P.E.D., and Niihara, K. (1998). Improvement in mechanical properties of powder-processed MoSi2 by the addition of Sc2O3 and Y2O3. J. Am. Ceram. Soci. 81(12). pp. 3141-3149.

Sweetman, B. and Sutton, O. (1998). Pratt Whitney's surprise leap. Interavia Business Technology, 53.621, p. 25.

Taylor, W.F. (1974). Deposit formation from deoxygenated hydrocarbons. I. General features. Ind. Eng. Chem., Prod. Res. Develop., vol. 13(2). 1974. pp. 133-138.

Taylor, W.F. (1974). Deposit formation from deoxygenated hydrocarbons. II. Effect of trace sulfur compounds. Ind. Eng. Chem., Prod. Res. Dev., vol. 15(1). 1974. pp. 64-68.

Taylor, W.F. and Frankenfeld, J.W. (1978). Deposit fromation from deoxygenated hydrocarbons. 3. Effects of trace nitrogen and oxygen compounds Ind. Eng. Chem., Prod. Res. Dev., vol. 17(1). 1978. pp. 86-90.

Technical Data. Teflon. WS Hampshire Inc. Retrieved from: http://catalog.wshampshire.com/Asset/psg_teflon_ptfe.pdf.

Technical Report. (1975). Quiet Clean Short-haul Experimental Engine (QCSEE) UTW fan preliminary design. NASA-CR-134842. Feb. 1, 1975. pp. 1-98.

Technical Report. (1977). Quiet Clean Short-haul Experimental Engine (QCSEE) Under-the-Wing (UTW) final design report. NASA-CR-134847. Jun. 1, 1977. pp. 1-697.

Thulin, R.D., Howe, D.C., and Singer, I.D. (1982). Energy efficient engine: High pressure turbine detailed design report. Prepared for NASA. NASA CR-165608. Recevied Aug. 9, 1984. pp. 1-178.

Tong, M.T., Jones, S.M., Haller, W.J., and Handschuh, R.F. (2009). Engine conceptual design studies for a hybrid wing body aircraft. NASA/TM-2009-215680. Nov. 1, 2009. pp. 1-15.

Trembley, Jr., H.F. (1977). Determination of effects of ambient conditions on aircraft engine emissions. ALF 502 combustor rig testing and engine verification test. Prepared for Environmental Protection Agency. Sep. 1977. pp. 1-256.

Tsirlin, M., Pronin, Y.E., Florina, E.K., Mukhametov, S. Kh., Khatsernov, M.A., Yun, H.M., . . . Kroke, E. (2001). Experimental investigation of multifunctional interphase coatings on SiC fibers for non-oxide high temperature resistant CMCs. High Temperature Ceramic Matrix Composites. 4th Int'l Conf. on High Temp. Ceramic Matrix Composites. Oct. 1-3, 2001. pp. 149-156.

Tummers, B. (2006). DataThief III. Retrieved from: https://datathief.org/DatathiefManual.pdf pp. 1-52.

Turbomeca Aubisque. Jane's Aero-engines, Aero-engines- Turbofan. Nov. 2, 2009.

Turner, M. G., Norris, A., and Veres, J.P. (2004). High-fidelity three-dimensional simulation of the GE90. NASA/TM-2004-212981. pp. 1-18.

Type Certificate Data Sheet No. E6NE. Department of Transportation Federal Aviation Administration. Jun. 7, 2002. pp. 1-10.

U.S. Department of Transportation: Federal Aviation Administration Advisory Circular, Runway overrun prevention, dated: Nov. 6, 2007, p. 1-8 and Appendix 1 pp. 1-15, Appendix 2 pp. 1-6, Appendix 3 pp. 1-3, and Appendix 4 pp. 1-5.

U.S. Department of Transportation: Federal Aviation Administration Advisory Circular. Standard operating procedures for flight deck crewmembers, Dated: Feb. 27, 2003, p. 1-6 and Appendices.

U.S. Department of Transportation: Federal Aviation Administration Type Certificate Data Sheet No. E6WE. Dated: May 9, 2000. p. 1-9.

Vasudevan, A.K. and Petrovic, J.J. (1992). A comparative overview of molybedenum disilicide composites. Materials Science and Engineering, A155, 1992. pp. 1-17.

Waters, M.H. and Schairer, E.T. (1977). Analysis of turbofan propulsion system weight and dimensions. NASA Technical Memorandum. Jan. 1977. pp. 1-65.

Webster, J.D., Westwood, M.E., Hayes, F.H., Day, R.J., Taylor, R., Duran, A., . . . Vogel, W.D. (1998). Oxidation protection coatings for C/SiC based on yttrium silicate. Journal of European Ceramic Society vol. 18. 1998. pp. 2345-2350.

Wendus, B.E., Stark, D.F., Holler, R.P., and Funkhouse, M.E. (2003). Follow-on technology requirement study for advanced subsonic transport. Technical Report prepared for NASA. NASA/CR-2003-212467. Aug. 1, 2003. pp. 1-47.

Whitaker, R. (1982). ALF 502: plugging the turbofan gap. Flight International, p. 237-241, Jan. 30, 1982.

Wie, Y.S., Collier, F.S., Wagner, R.D., Viken, J.K., and Pfenniger, W. (1992). Design of a hybrid laminar flow control engine nacelle. AIAA-92-0400. 30th Aerospace Sciences Meeting Exhibit. Jan. 6-9, 1992. pp. 1-14.

Wikipedia. Stiffness. Retrieved Jun. 28, 2018 from: https://en.wikipedia.org/wiki/Stiffness.

(56) References Cited

OTHER PUBLICATIONS

Wikipedia. Torsion spring. Retreived Jun. 29, 2018 from: https://en.wikipedia.org/wiki/Torsion_spring.

Wilfert, G. (2008). Geared fan. Aero-Engine Design: From State of the Art Turbofans Towards Innovative Architectures, von Karman Institute for Fluid Dynamics, Belgium, Mar. 3-7, 2008. pp. 1-26.

Willis, W.S. (1979). Quiet clean short-haul experimental engine (QCSEE) final report. NASA/CR-159473 pp. 1-289.

Winn, A. (Ed). (1990). Wide Chord Fan Club. Flight International, 4217(137). May 23-29, 1990. pp. 34-38.

Wright, G.H. and Russell, J.G. (1990). The M.45SD-02 variable pitch geared fan engine demonstrator test and evaluation experience. Aeronautical Journal., vol. 84(836). Sep. 1980. pp. 268-277.

Xie, M. (2008). Intelligent engine systems: Smart case system. NASA/CR-2008-215233. pp. 1-31.

Xu, Y., Cheng, L., Zhang, L., Ying, H., and Zhou, W. (1999). Oxidation behavior and mechanical properties of C/SiC composites with Si-MoSi2 oxidation protection coating. J. of Mat. Sci. vol. 34. 1999. pp. 6009-6014.

Zalud, T. (1998). Gears put a new spin on turbofan performance. Machine Design, 70(20), p. 104.

Zamboni, G. and Xu, L. (2009). Fan root aerodynamics for large bypass gas turbine engines: Influence on the engine performance and 3D design. Proceedings of ASME Turbo Expo 2009: Power for Land, Sea and Air. Jun. 8-12, 2009, Orlando, Florida, USA. pp. 1-12.

Zhao, J.C. and Westbrook, J.H. (2003). Ultrahigh-temperature materials for jet engines. MRS Bulletin. vol. 28(9). Sep. 2003. pp. 622-630.

\* cited by examiner

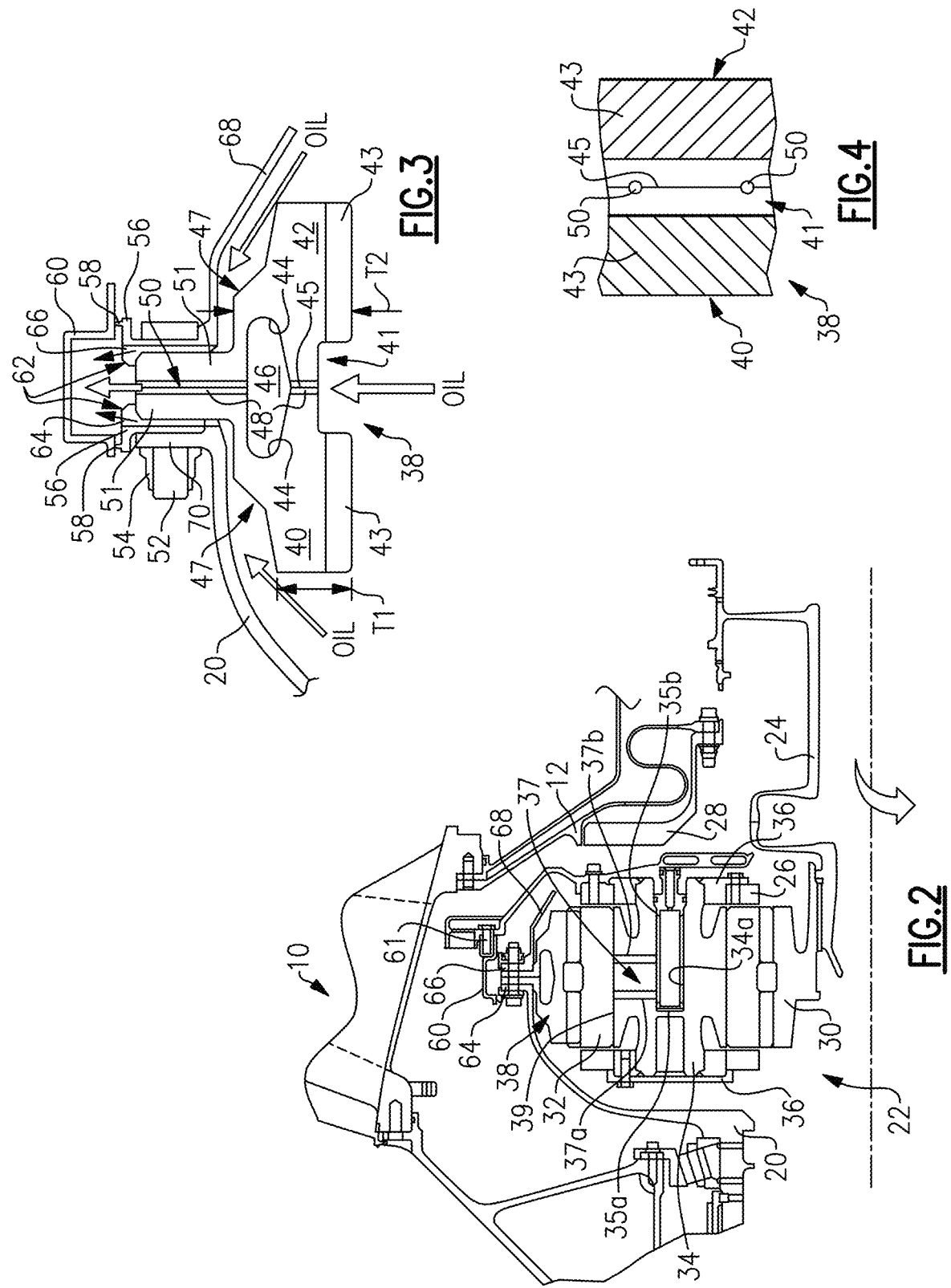

EPICYCLIC GEAR TRAIN

CROSS REFERENCE TO RELATED APPLICATIONS

The present disclosure is a continuation of U.S. patent application Ser. No. 18/196,048 filed May 11, 2023, which is a continuation of U.S. patent application Ser. No. 17/711,177 filed Apr. 1, 2022, now U.S. Pat. No. 11,680,492, granted Jun. 20, 2023, which is a continuation of U.S. patent application Ser. No. 17/145,766 filed Jan. 11, 2021, now U.S. Pat. No. 11,319,831, granted May 3, 2022, which is a continuation of U.S. patent application Ser. No. 16/805,917 filed Mar. 2, 2020, now U.S. Pat. No. 10,890,245, granted Jan. 12, 2021, which is a continuation of U.S. patent application Ser. No. 15/984,494, filed May 21, 2018, now U.S. Pat. No. 10,577,965 granted Mar. 3, 2020, which is a continuation of U.S. patent application Ser. No. 14/824,351, filed Aug. 12, 2015, now U.S. Pat. No. 9,976,437, granted May 22, 2018, which is a continuation-in-part of U.S. patent application Ser. No. 13/486,766, filed Jun. 1, 2012, which is a continuation of U.S. patent application Ser. No. 13/340,735, filed Dec. 30, 2011, now U.S. Pat. No. 8,708,863, granted Apr. 29, 2014, which is a continuation-in-part of U.S. patent application Ser. No. 11/504,220, filed Aug. 15, 2006, now U.S. Pat. No. 8,753,243, granted Jun. 17, 2014.

BACKGROUND OF THE INVENTION

This invention relates to a ring gear used in an epicyclic gear train of a gas turbine engine.

Gas turbine engines typically employ an epicyclic gear train connected to the turbine section of the engine, which is used to drive the turbo fan. In a typical epicyclic gear train, a sun gear receives rotational input from a turbine shaft through a compressor shaft. A carrier supports intermediate gears that surround and mesh with the sun gear. A ring gear surrounds and meshes with the intermediate gears. In arrangements in which the carrier is fixed against rotation, the intermediate gears are referred to as "star" gears and the ring gear is coupled to an output shaft that supports the turbo fan.

Typically, the ring gear is connected to the turbo fan shaft using a spline ring. The spline ring is secured to a flange of the turbo fan shaft using circumferentially arranged bolts. The spline ring includes splines opposite the flange that supports a splined outer circumferential surface of the ring gear. The ring gear typically includes first and second portions that provide teeth facing in opposite directions, which mesh with complimentary oppositely facing teeth of the star gears.

An epicyclic gear train must share the load between the gears within the system. As a result, the splined connection between the ring gear and spline ring is subject to wear under high loads and deflection. Since the spline connection requires radial clearance, it is difficult to get a repeatable balance of the turbo fan assembly. Balance can also deteriorate over time with spline wear.

SUMMARY OF THE INVENTION

In a featured embodiment, a turbine engine has a fan shaft. At least one tapered bearing is mounted on the fan shaft. The fan shaft includes at least one passage extending in a direction having at least a radial component, and adjacent the at least one tapered bearing. A fan is mounted for rotation on the tapered bearing. An epicyclic gear train is coupled to drive the fan. The epicyclic gear train includes a carrier supporting intermediate gears that mesh with a sun gear. A ring gear surrounds and meshes with the intermediate gears. Each of the intermediate gears are supported on a respective journal bearing. The epicyclic gear train defines a gear reduction ratio of greater than or equal to about 2.3. A turbine section is coupled to drive the fan through the epicyclic gear train. The turbine section has a fan drive turbine that includes a pressure ratio that is greater than about 5. The fan includes a pressure ratio that is less than about 1.45, and the fan has a bypass ratio of greater than about ten (10).

In another embodiment according to the previous embodiment, the fan shaft is coupled to the ring gear.

In another embodiment according to any of the previous embodiments, the at least one tapered bearing includes a first tapered bearing and the at least one passage includes a first passage and a second passage. The first passage is located at an axially forward side of the first tapered bearing and the second passage is located at an axially aft side of the first tapered bearing.

In another embodiment according to any of the previous embodiments, the fan shaft includes, on a radially inner surface, at least one well extending between axial sides and a radial side, and the at least one passage opens at the radial side.

In another embodiment according to any of the previous embodiments, the fan shaft includes, on a radially inner surface, a plurality of wells each extending between axial side walls and a radial side wall, and the at least one passage includes a plurality of passages that open at respective ones of the radial side walls of the plurality of wells.

In another embodiment according to any of the previous embodiments, two wells of the plurality of wells are axially adjacent such that the two wells share a common axial side wall.

In another embodiment according to any of the previous embodiments, the axial side walls are gradually sloped.

In another embodiment according to any of the previous embodiments, the epicyclic gear train has a gear reduction ratio of greater than or equal to 2.3.

In another embodiment according to any of the previous embodiments, the epicyclic gear train has a gear reduction ratio of greater than or equal to about 2.5.

In another embodiment according to any of the previous embodiments, the epicyclic gear train has a gear reduction ratio of greater than or equal to 2.5.

In another embodiment according to any of the previous embodiments, the fan defines a bypass ratio of greater than about 10.5:1 with regard to a bypass airflow and a core airflow.

In another embodiment according to any of the previous embodiments, there are three turbines, with the fan drive turbine being a lowest pressure turbine, and there being a high pressure turbine and an intermediate pressure turbine, with the high pressure turbine and the intermediate pressure turbine each driving a compressor rotor.

Although different examples have the specific components shown in the illustrations, embodiments of this invention are not limited to those particular combinations. It is possible to use some of the components or features from one of the examples in combination with features or components of another of the examples.

These and other features disclosed herein can be best understood from the following specification and drawings, the following of which is a brief description.

BRIEF DESCRIPTION OF THE DRAWINGS

FIG. 2 is an enlarged cross-sectional view of the epicyclic gear train shown in FIG. 1.

FIG. 3 is an enlarged cross-sectional view of an example ring gear similar to the arrangement shown in FIG. 2.

FIG. 4 is a view of the ring gear shown in FIG. 3 viewed in a direction that faces the teeth of the ring gear in FIG. 3.

DETAILED DESCRIPTION

Figure 1:
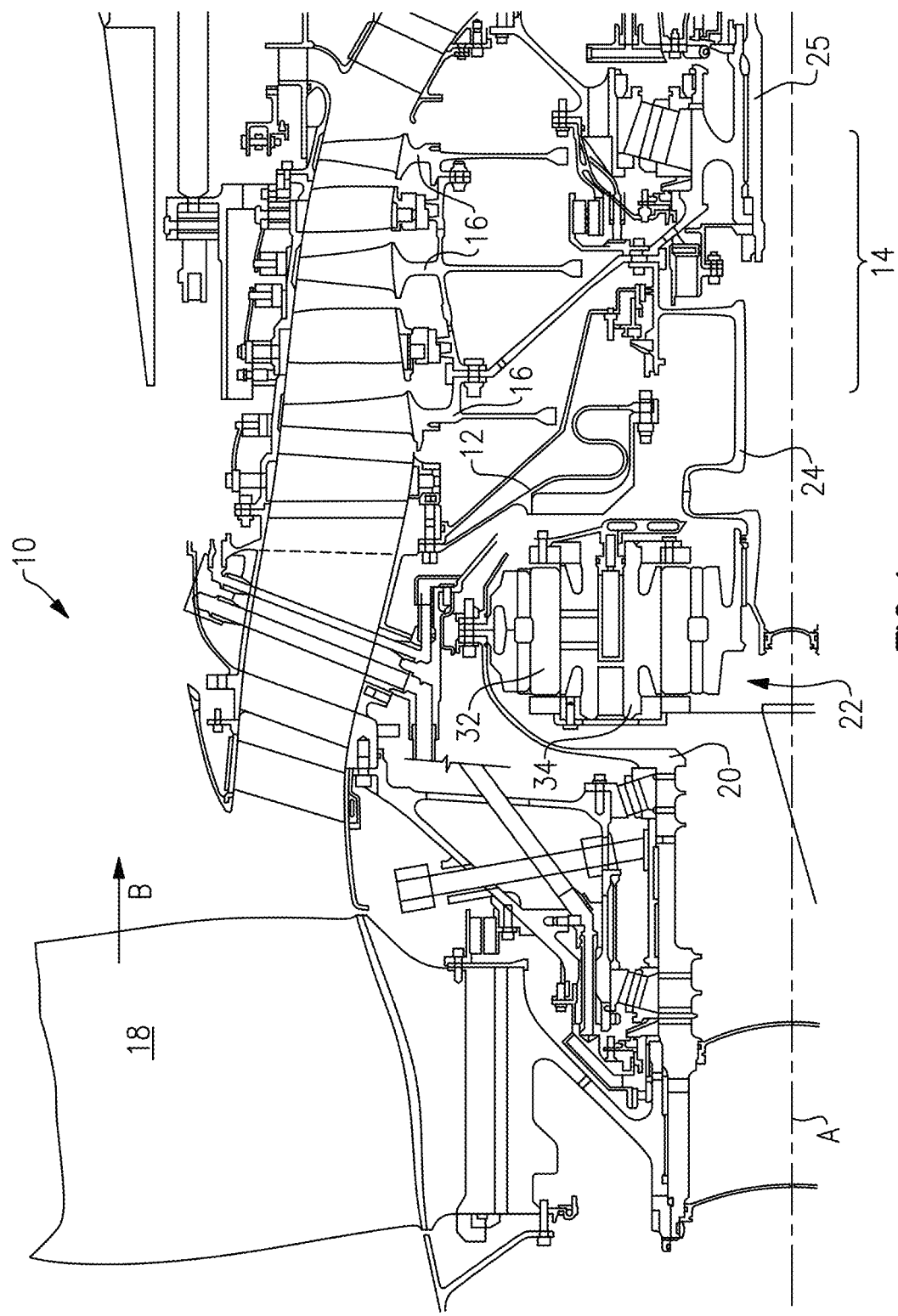
FIG. 1 is a partial cross-sectional view of a front portion of a gas turbine engine illustrating a turbo fan, epicyclic gear train and a compressor section.

A portion of a gas turbine engine 10 is shown schematically in FIG. 1. The turbine engine 10 includes a fixed housing 12 that is constructed from numerous pieces secured to one another. A compressor section 14 having compressor hubs 16 with blades are driven by a turbine shaft 25 about an axis A. A turbo fan 18 is supported on a turbo fan shaft 20 that is driven by a compressor shaft 24, which supports the compressor hubs 16, through an epicyclic gear train 22.

In the example arrangement shown, the epicyclic gear train 22 is a star gear train. Referring to FIG. 2, the epicyclic gear train 22 includes a sun gear 30 that is connected to the compressor shaft 24, which provides rotational input, by a splined connection. A carrier 26 is fixed to the housing 12 by a torque frame 28 using fingers (not shown) known in the art. The carrier 26 supports star gears 32 using journal bearings 34 that are coupled to the sun gear 30 by meshed interfaces between the teeth of sun and star gears 30, 32. Multiple star gears 32 are arranged circumferentially about the sun gear 30. Retainers 36 retain the journal bearings 34 to the carrier 26. A ring gear 38 surrounds the carrier 26 and is coupled to the star gears 32 by meshed interfaces. The ring gear 38, which provides rotational output, is secured to the turbo fan shaft 20 by circumferentially arranged fastening elements, which are described in more detail below.

As shown, each of the star gears 32 is supported on one of the journal bearings 34. Each journal bearing 34 has an internal central cavity 34a that extends between axial ends 35a and 35b. In this example, as shown, the internal central cavity 34a is axially blind in that the axial end 35a is closed. At least one passage 37 extends from the internal central cavity 34a to a peripheral journal surface 39. In the example, the at least one passage 37 includes a first passage 37a and a second passage 37b that is axially spaced from the first passage 37a. As shown, the first and second passages 37a and 37a are non-uniformly spaced with regard to the axial ends 35a and 35b of the internal central cavity 34a.

In operation, lubricant is provided to the internal central cavity 34a. The lubricant flows through the internal central cavity 34a and then outwardly through the at least one passage 37 to the peripheral journal surface 39. The arrangement of the internal central cavity 34a and at least one passage 37 thereby serves to cool and lubricate the journal bearing 32.

The gas turbine engine 10 is a high-bypass geared architecture aircraft engine. In one disclosed, non-limiting embodiment, the engine 10 has a bypass ratio that is greater than about six (6) to ten (10), the epicyclic gear train 22 is a planetary gear system or other gear system with a gear reduction ratio of greater than about 2.3 or greater than about 2.5, and a low pressure turbine of the engine 10 has a pressure ratio that is greater than about 5. In one disclosed embodiment, the engine 10 bypass ratio is greater than about ten (10:1) or greater than about 10.5:1, the turbofan 18 diameter is significantly larger than that of the low pressure compressor of the compressor section 14, and the low pressure turbine has a pressure ratio that is greater than about 5:1. In one example, the epicyclic gear train 22 has a gear reduction ratio of greater than about 2.3:1 or greater than about 2.5:1. It should be understood, however, that the above parameters are only exemplary of one embodiment of a geared architecture engine and that the present invention is applicable to other gas turbine engines including direct drive turbofans.

A significant amount of thrust is provided by a bypass flow B due to the high bypass ratio. The fan 18 of the engine 10 is designed for a particular flight condition—typically cruise at about 0.8 M and about 35,000 feet. The flight condition of 0.8 M and 35,000 ft, with the engine at its best fuel consumption—also known as "bucket cruise TSFC"—is the industry standard parameter of lbm of fuel being burned divided by lbf of thrust the engine produces at that minimum point. "Low fan pressure ratio" is the pressure ratio across the fan blade alone. The low fan pressure ratio as disclosed herein according to one non-limiting embodiment is less than about 1.45. "Low corrected fan tip speed" is the actual fan tip speed in ft/sec divided by an industry standard temperature correction of [(Tambient deg R)/518.7)^0.5]. The "Low corrected fan tip speed" as disclosed herein according to one non-limiting embodiment is less than about 1150 ft/second.

Referring to FIGS. 3 and 4, the ring gear 38 is a two-piece construction having first and second portions 40, 42. The first and second portions 40, 42 abut one another at a radial interface 45. A trough 41 separates oppositely angled teeth 43 (best shown in FIG. 4) on each of the first and second portions 40, 42. The arrangement of teeth 43 forces the first and second portions 40, 42 toward one another at the radial interface 45. The back side of the first and second portions 40, 42 includes a generally S-shaped outer circumferential surface 47 that, coupled with a change in thickness, provides structural rigidity and resistance to overturning moments. The first and second portions 40, 42 have a first thickness T1 that is less than a second thickness T2 arranged axially inwardly from the first thickness T1. The first and second portions 40, 42 include facing recesses 44 that form an internal annular cavity 46.

The first and second portions 40, 42 include flanges 51 that extend radially outward away from the teeth 43. The turbo fan shaft 20 includes a radially outwardly extending flange 70 that is secured to the flanges 51 by circumferentially arranged bolts 52 and nuts 54, which axially constrain and affix the turbo fan shaft 20 and ring gear 38 relative to one another. Thus, the spline ring is eliminated, which also reduces heat generated from windage and churning that resulted from the sharp edges and surface area of the splines. The turbo fan shaft 20 and ring gear 38 can be rotationally balanced with one another since radial movement resulting from the use of splines is eliminated. An oil baffle 68 is also secured to the flanges 51, 70 and balanced with the assembly.

Seals 56 having knife edges 58 are secured to the flanges 51, 70. The first and second portions 40, 42 have grooves 48 at the radial interface 45 that form a hole 50, which expels oil through the ring gear 38 to a gutter 60 that is secured to the carrier 26 with fasteners 61 (FIG. 2). The direct radial flow path provided by the grooves 48 reduces windage and churning by avoiding the axial flow path change that existed with splines. That is, the oil had to flow radially and then axially to exit through the spline interface. The gutter 60 is constructed from a soft material such as aluminum so that the knife edges 58, which are constructed from steel, can cut into the aluminum if they interfere. Referring to FIG. 3, the seals 56 also include oil return passages 62 provided by first and second slots 64 in the seals 56, which permit oil on either side of the ring gear 38 to drain into the gutter 60. In the example shown in FIG. 2, the first and second slots 64, 66 are instead provided in the flange 70 and oil baffle 68, respectively.

Figure 5:
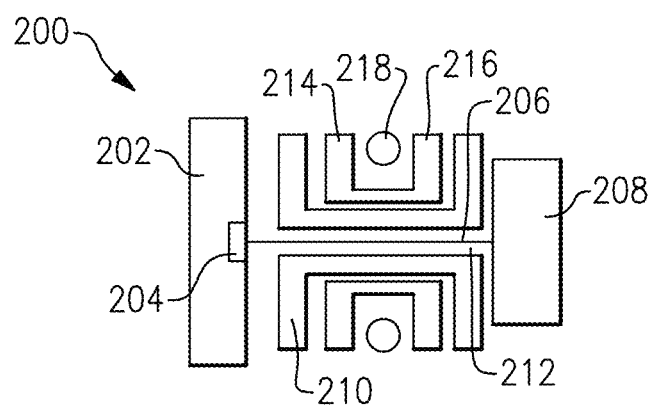
FIG. 5 shows another embodiment.

FIG. 5 shows an embodiment 200, wherein there is a fan drive turbine 208 driving a shaft 206 to in turn drive a fan rotor 202. A gear reduction 204 may be positioned between the fan drive turbine 208 and the fan rotor 202. This gear reduction 204 may be structured and operate like the gear reduction disclosed above. A compressor rotor 210 is driven by an intermediate pressure turbine 212, and a second stage compressor rotor 214 is driven by a turbine rotor 216. A combustion section 218 is positioned intermediate the compressor rotor 214 and the turbine section 216.

Figure 6:
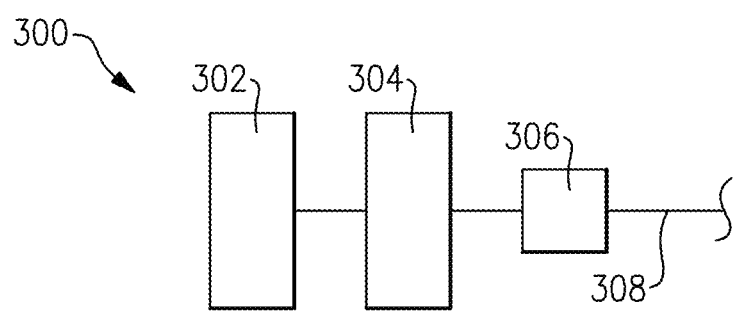
FIG. 6 shows yet another embodiment.

FIG. 6 shows yet another embodiment 300 wherein a fan rotor 302 and a first stage compressor 304 rotate at a common speed. The gear reduction 306 (which may be structured as disclosed above) is intermediate the compressor rotor 304 and a shaft 308 which is driven by a low pressure turbine section.

Although embodiments of this invention have been disclosed, a worker of ordinary skill in this art would recognize that certain modifications would come within the scope of this invention. For that reason, the following claims should be studied to determine the true scope and content of this invention.

What is claimed is:

1. A gas turbine engine comprising:
   a propulsor section including a propulsor supported on a propulsor shaft;
   a turbine section including a turbine shaft;
   a compressor section having a plurality of compressor hubs with blades driven by the turbine shaft about an engine axis; and
   an epicyclic gear train interconnecting the propulsor shaft and the turbine shaft, the epicyclic gear train comprising:
      a sun gear coupled to the turbine shaft;
      intermediary gears arranged circumferentially about and meshing with the sun gear;
      a carrier and support means for supporting each of the intermediate gears relative to the carrier; and
      a ring gear including first and second portions, the first and second portions each having an inner periphery with teeth intermeshing with the intermediate gears, the first and second portions having axially opposed faces abutting one another at a radial interface, the ring gear including discharge means for expelling lubricant from the radial interface outwardly of the ring gear, and the discharge means including facing recesses of the first and second portions that form an internal annular cavity along the radial interface;
      wherein the first and second portions including respective flanges extending along the radial interface radially outward from the teeth, the epicyclic gear train defines a gear reduction ratio of greater than or equal to 2.5, and the ring gear includes engagement means for forcing the first portion and the second portion toward one another at the radial interface.

2. The gas turbine engine as recited in claim 1, wherein the epicyclic gear train is a planetary gear system.

3. The gas turbine engine as recited in claim 1, wherein the ring gear includes attachment means for securing the first and second portions of the ring gear to the propulsor shaft.

4. The gas turbine engine as recited in claim 1, wherein the first and second portions of the gear train includes means for resisting overturning moments.

5. The gas turbine engine as recited in claim 1, wherein the ring gear includes accumulation means for capturing lubrication expelled toward the radial interface.

6. The gas turbine engine as recited in claim 1, wherein the support means includes journal bearings that support the respective intermediate gears, and each journal bearing includes lubrication means for conveying lubricant through the journal bearing to a peripheral journal surface of the journal bearing.

7. The gas turbine engine as recited in claim 1, wherein the gear train includes a torque frame having securement means for fixing the carrier to a fixed housing.

8. The gas turbine engine as recited in claim 1, wherein:
   the gear train includes collection means for receiving lubricant expelled by the discharge means through the radial interface;
   the discharge means inhibits an axial flow of lubricant passing along the radial interface prior to being expelled toward the collection means; and
   the gear train includes return means for communicating lubricant from an outer periphery of the respective first and second portions of the ring gear outwardly to the collection means.

9. The gas turbine engine as recited in claim 1, further comprising:
   an input shaft that interconnects the sun gear and the turbine shaft, the input shaft including an undulation that extends radially outward relative to the engine axis.

10. The gas turbine engine as recited in claim 1, wherein the discharge means includes grooves at the radial interface that form a hole.

11. The gas turbine engine as recited in claim 10, wherein the hole provides a direct radial path through the ring gear.

12. The gas turbine engine as recited in claim 1, wherein the propulsor is a turbo fan, and the propulsor shaft is a fan shaft supporting the fan.

13. A gas turbine engine comprising:
   a propulsor section including a propulsor supported on a propulsor shaft;
   a turbine section including a turbine shaft;
   a compressor section having a plurality of compressor hubs with blades driven by the turbine shaft about an engine axis; and
   an epicyclic gear train interconnecting the propulsor shaft and the turbine shaft, the epicyclic gear train comprising:
      a sun gear coupled to the turbine shaft;
      intermediary gears arranged circumferentially about and meshing with the sun gear;
      a carrier and support means for supporting each of the intermediate gears relative to the carrier; and
      a ring gear including first and second portions, the first and second portions each having an inner periphery with teeth intermeshing with the intermediate gears, the first and second portions having axially opposed faces abutting one another at a radial interface, the ring gear including discharge means for expelling lubricant from the radial interface outwardly of the ring gear, and the discharge means including facing recesses of the first and second portions that form an internal annular cavity along the radial interface;

wherein the propulsor is a turbo fan, and the propulsor shaft is a fan shaft supporting the fan.

14. The gas turbine engine as recited in claim 13, wherein the ring gear includes attachment means for securing the first and second portions of the ring gear to the propulsor shaft.

15. The gas turbine engine as recited in claim 13, wherein the first and second portions of the gear train includes means for resisting overturning moments.

16. The gas turbine engine as recited in claim 13, wherein the ring gear includes accumulation means for capturing lubrication expelled toward the radial interface.

17. The gas turbine engine as recited in claim 13, wherein the gear train includes a torque frame having securement means for fixing the carrier to a fixed housing.

18. The gas turbine engine as recited in claim 13, wherein:
the gear train includes collection means for receiving lubricant expelled by the discharge means through the radial interface;
the discharge means inhibits an axial flow of lubricant passing along the radial interface prior to being expelled toward the collection means; and
the gear train includes return means for communicating lubricant from an outer periphery of the respective first and second portions of the ring gear outwardly to the collection means.

19. A gas turbine engine comprising:
a propulsor section including a propulsor supported on a propulsor shaft;
a turbine section including a turbine shaft;
a compressor section having a plurality of compressor hubs with blades driven by the turbine shaft about an engine axis; and
an epicyclic gear train interconnecting the propulsor shaft and the turbine shaft, the epicyclic gear train comprising:
a sun gear coupled to the turbine shaft;
intermediary gears arranged circumferentially about and meshing with the sun gear;
a carrier and support means for supporting each of the intermediate gears relative to the carrier;
a ring gear including first and second portions, the first and second portions each having an inner periphery with teeth intermeshing with the intermediate gears, the first and second portions having axially opposed faces abutting one another at a radial interface, the ring gear including discharge means for expelling lubricant from the radial interface outwardly of the ring gear, and the discharge means including facing recesses of the first and second portions that form an internal annular cavity along the radial interface; and
sealing means along an outer periphery of the respective first and second portions.

20. The gas turbine engine as recited in claim 19, wherein:
the gear train includes collection means for receiving lubricant expelled by the discharge means through the radial interface;
the gear train includes return means for communicating lubricant from the outer periphery of the respective first and second portions of the ring gear outwardly to the collection means.

* * * * *